United States Patent [19]

Palaniappan et al.

[11] Patent Number: 4,983,902
[45] Date of Patent: Jan. 8, 1991

[54] FAST CURRENT DISCHARGING SWITCH FOR A VARIABLE RELUCTANCE MOTOR DRIVE

[75] Inventors: Rasappa Palaniappan, Michigan City, Ind.; John J. Dhyanchand, Rockford, Ill.

[73] Assignee: Sundstrand Corporation, Rockford, Ill.

[21] Appl. No.: 430,244

[22] Filed: Nov. 1, 1989

[51] Int. Cl.$^5$ .............................................. H02P 7/40
[52] U.S. Cl. ..................................... 318/701; 318/696
[58] Field of Search ............... 318/701, 696, 439, 254, 318/138

[56] References Cited

U.S. PATENT DOCUMENTS

| | | | |
|---|---|---|---|
| 4,272,713 | 6/1981 | Pritchard | 318/696 |
| 4,295,083 | 10/1981 | Leenhouts | 318/696 |
| 4,329,635 | 5/1982 | Reilly | 318/696 |
| 4,486,696 | 12/1984 | Matsushita et al. | 318/696 |
| 4,500,824 | 2/1985 | Miller | 318/701 |
| 4,514,675 | 4/1985 | Matumoto et al. | 318/696 |
| 4,584,506 | 4/1986 | Kaszmann | 318/254 |
| 4,609,859 | 9/1986 | Williams | 318/810 |
| 4,684,867 | 8/1987 | Miller et al. | 318/701 |
| 4,760,320 | 7/1988 | Tsugita | 318/696 |

FOREIGN PATENT DOCUMENTS

| | | | |
|---|---|---|---|
| 61-66557 | 4/1986 | Japan | |
| 61-185094 | 8/1986 | Japan | 318/696 |
| 61-244296 | 10/1986 | Japan | 318/696 |
| 8901260 | 2/1989 | PCT Int'l Appl. | 318/701 |

Primary Examiner—Bentsu Ro
Attorney, Agent, or Firm—Antonelli, Terry, Stout & Kraus

[57] ABSTRACT

A circuit (40) for controlling a variable reluctance motor in accordance with the invention includes a first switch (Q1) having first and second electrodes, the first electrode being connectable to a first potential (14) of a DC power supply (12) and the second electrode being connected to a first terminal of each phase winding of the motor, and at least one additional switch (Q2-Q4), the first electrode of each additional switch being connected to a second terminal of an associated phase winding and the second electrode of each additional switch being connectable to a second potential (16) of the DC power supply; a number of freewheel diodes (20), a first electrode of each freewheel diode being connected to the second terminal of an associated phase winding and a second electrode of each freewheel diode being connectable to the first potential of the DC power supply; a first diode (24) coupled to the firt terminal of each phase winding; a controller (18) for generating control signals of each of the switches; and a circuit (42) coupled to the first electrode of the first diode, for stopping the current flow in a phase winding connected to the switches being turned off, for generating a potential applied to the phase winding which opposes a potential induced in the phase winding connected to the switches being turned off in response to turning off of the switches to accelerate stopping current flow in the winding connected to the switches being turned off.

25 Claims, 1 Drawing Sheet

FAST CURRENT DISCHARGING SWITCH FOR A VARIABLE RELUCTANCE MOTOR DRIVE

TECHNICAL FIELD

The present invention relates to circuits for turning off current flow in phase windings of variable reluctance motors.

BACKGROUND ART

Motors which operate on a variable reluctance principle produce torque by switching current in each phase winding in a predetermined sequence that is synchronized with the angular position of the rotor so that the magnetic force of attraction between the rotor and the stator poles results as they approach each other. Each phase winding is wound around pairs of diametrically opposed stator poles. The current in each of the phase windings is switched off at an angular position before the rotor poles nearest the stator poles of that phase rotate past an aligned position which has a minimum reluctance between the aligned poles. Failure to switch the current at the aligned position results in a torque opposite to the direction of rotation of the rotor. Quick reduction of phase current is known to avoid negative torque. See U.S. Pat. No. 4,500,824.

FIG. 1 illustrates a block diagram of a prior art control circuit for controlling the switching of current flow in windings of a multiple phase variable reluctance motor. The control circuit controls the current flow from a DC voltage source 12 having positive and negative terminals 14 and 16 respectively through phase windings A-C. A switch controller 18 commutates switches Q1-Q4 to control the flow of current sequentially through phase windings A-C. The control of current through phase winding A is produced by generating switching signals Q1 and Q2 which forward bias transistors Q1 and Q2 to cause current flow from positive terminal 14 through transistor Q1 through phase winding A through transistor Q2 to negative terminal 16 and removing the switching signals Q1 and Q2 at the commutation point before rotor poles nearest the stator poles of that phase rotate past the aligned position between the poles of the rotor and stator where minimum reluctance exists in the magnetic circuit between the stator and rotor. Thereafter switching signals Q1 and Q3 are generated by the switch controller 18 to forward bias the transistors Q1 and Q3 to cause current flow through phase winding B and thereafter turn off switches Q1 and Q3 in the same manner as switches Q1 and Q2 described above. Finally, switching signals Q1 and Q4 are generated to forward bias transistor switches Q1 and Q4 to cause current flow through phase winding C in the same manner as phase windings A and B. This process repeats for each revolution of the rotor. As the rotor rotates each of the phase windings A-C are sequentially commutated by the switch controller 18 to establish current flow from the positive terminal 14 of the power supply 12 to the negative terminal 16 such that the current in each of the phase windings A-C is switched off in each phase at the commutation point before the rotor poles nearest the stator poles of that phase rotate past the aligned position representing minimum reluctance between the poles of the rotor and stator. Freewheeling diodes 20 are respectively connected between a first terminal 22 of each of the phase windings A-C and the positive terminal 14 of the power supply 12. A first diode 24 connects the negative terminal 16 of the power supply 12 to a second terminal 26 of each of the phase windings A-C. The function of the freewheeling diodes 20 and first diode 24 is to provide a return path for current which is flowing in each of the phase windings A-C at the time of turn off of the pair of switches controlling the flow in that phase winding. Initially when the pair of switches connected to each phase winding A-C is forward biased current flows from terminal 26 to terminal 22 to cause a voltage drop from terminal 26 to terminal 22. At the time of turning off the pair of switches which are connected to the phase winding in which current is flowing, a positive potential is induced at terminal 22 with respect to terminal 26 of the phase winding which forward biases the freewheel diode 20 connected to the phase winding and diode 24 to cause current flow from terminal 22 through diode 20 through the power supply 12 and through diode 24 to terminal 26. The induced positive potential at terminal 22 with respect to terminal 26, which opposes the reduction in current caused by initiating turning off the switches slows down the stopping of current flow in the phase winding connected to the switches which are being turned off. Slowing down the turn off of current flow in a phase winding prevents the generation of maximum torque by the phase winding as a consequence of the requirement that the turn off point of the switches connected to the phase winding must be advanced with respect to the minimum reluctance position of the poles of the rotor and the phase of the stator being turned off. Retarding the turning off point of the switches controlling current flow in a phase winding as close as possible to the minimum reluctance position increases the torque generated by that phase winding. Accordingly, speeding up the turning off of current flow in the phase winding under the control of the switch controller 18 increases the torque generated by the motor.

DISCLOSURE OF THE INVENTION

The present invention provides a circuit and method for controlling the energizing of each phase winding of a variable reluctance motor for providing maximum torque. In accordance with the invention, turning off current flow in each phase winding is accelerated by generating a potential which opposes an induced potential caused by turning off switches connected to the phase winding. A transformer is used to generate the potential which opposes the induced potential. The transformer has a primary winding which is connected in series with a second diode in a series circuit which is connected between the first and second potentials of the power supply with the secondary being connected in series with a first diode which is connected between one of the terminals of the power supply and a terminal of the phase at which the potential is applied which opposes the potential induced in the winding caused by turning off of the switches. Initial current flow through the secondary of the transformer caused by turning off of the switches forward biases the second diode in the series circuit of the primary to cause the power supply potential to be dropped across the primary winding. The potential of the power supply which is dropped across the primary winding is changed (either up or down) by the secondary winding and is applied to the terminal opposite the terminal of the phase winding at which the potential was induced by turning off of the switches. The opposing potential accelerates the stopping of current flow in the phase winding connected to the switches being turned off which permits the stopping of current flow in the phase winding faster than in the prior art. Increasing the speed of stopping current flow in each phase winding permits the switching point for turning off the switches connected to the phase winding in which current flow is to be stopped to be retarded toward the minimum reluctance position between the phase being turned off and the rotor poles which increases the torque generated by the rotor.

A circuit for controlling energizing each phase winding of a variable reluctance motor to produce rotation of a rotor in accordance with the invention includes a first ;witch having first and second electrodes which are electrically connected together in response to a control signal applied to a control electrode, the first electrode being connected to a first potential of a DC power supply and the second electrode being connected to a first terminal of each phase winding and at least one additional switch with each additional switch having first and second electrodes which are electrically connected together in response to a control signal applied to a control electrode, the first electrode of each additional switch being connected to a second terminal of an associated phase winding and the second electrode of each additional switch being connected to a second potential of the DC power a number of freewheel diodes equal in number to the number of phase windings, a first electrode of each diode being connected to the second terminal of an associated phase winding and a second electrode of each freewheel diode being connected to the first potential of the DC power supply; a first diode having a first electrode, and a second electrode coupled to the first terminal of each phase winding; a controller for generating the control signals of each of the switches to control flow of current in the phase windings including turning off of the flow of current in each phase windings; and a potential generation circuit coupled to the first electrode of the first diode, in response to control signals being applied to the first switch and the at least one additional switch to cause current to stop flowing in a phase winding connected to the switches being turned off, for generating a potential applied to the first terminal of each winding which opposes a potential induced at the second terminal of the phase winding connected to the switches being turn off in response to turning off the switches to accelerate stopping current flow in the phase winding connected to the switches being turned off. The circuit for generating the potential comprises a transformer having a primary and a secondary winding, the primary winding being connected in series with a second diode in a series circuit which is connected between the first and second potentials of the power supply, the second diode being reversed biased until the signals are applied to the first switch and one of the at least one additional switch to cause current to stop flowing in the phase winding connected to the switches being turned off and being forward biased in response to the signals being applied to the switches being turned off, and the secondary winding being connected in series with the first diode. The generated potential is change up or down from the primary to the secondary winding. The first diode is forward biased in response to the signals causing the switches to be turned off and the second diode is forward biased in response to the flow of current caused by forward biasing of the first diode. A diode is connected between each of the additional switches and the second potential of the power supply. The switches are preferably semiconductor switches and may be power transistors or four layer devices.

In a circuit for stopping current flow in each phase winding of a variable reluctance motor, to produce rotation of a rotor, an improvement in accordance with the invention includes a pair of semiconductor switches respectively connected between different terminals of each phase winding and different potentials of a DC power supply, each pair of switches connecting and disconnecting the phase winding from the power supply; and a potential generation circuit, in response to signals being applied to each pair of switches by a controller causing each pair of switches to turn off, for generating a potential applied to the phase winding connected to the switches being turned off to oppose a potential induced in the phase winding connected to the pair of switches being turned off to accelerate stopping current flow in the phase winding connected to the pair of switches being turned off. The circuit for generating the potential comprises a transformer having a primary and a secondary winding, the primary winding being connected to a primary winding diode in a series circuit which is connected between the different potentials of the power supply, the primary winding diode being reversed biased until signals are applied to the switches to cause current to stop flowing in the phase winding connected to the switches being turned off and being forward biased in response to the signals being applied to the switches being turned off and the secondary winding being connected in series with a secondary winding diode. The potential is changed from the primary winding to the secondary winding. The primary winding diode is forward biased in response to current flow caused by an initial current flow through the secondary winding which causes the potential to be generated by the secondary winding. A diode is connected between one of the switches and the second potential of the power supply.

A method for stopping current flow in each phase winding of a variable reluctance motor in which current flow through each phase winding is controlled by controlling conductivity of first and second switches respectively connected to first and second reference potentials of a power supply and to different terminals of each winding to produce rotation of a rotor in accordance with the invention includes generating control signals for causing the first and second switches to stop current flow in each phase winding; and in response to a potential induced in each phase winding by initiating turning off of the first and second switches, generating a potential applied to each phase winding which opposes the induced potential to accelerate stopping current flow in the phase winding connected to the switches being turned off.

BEST MODE FOR CARRYING OUT THE INVENTION

Figure 1:
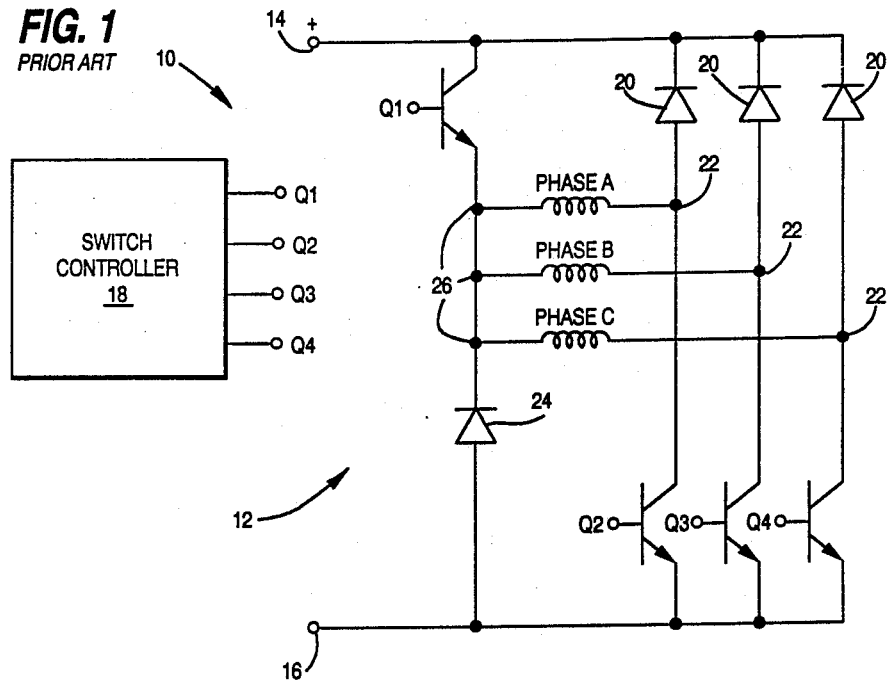
FIG. 1 illustrates a prior art circuit for controlling the flow of current in phase windings of a variable reluctance motor.
Figure 2:
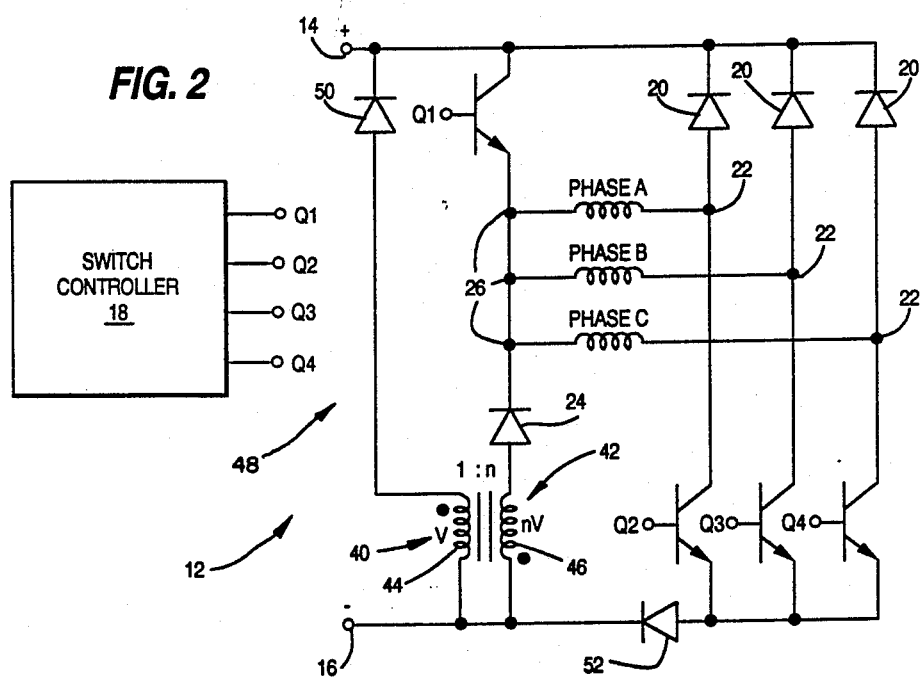
FIG. 2 illustrates a circuit in accordance with the present invention for controlling the flow of current in phase windings of a variable reluctance motor.

The present invention differs from the circuit of FIG. 1 in providing a potential generation circuit 40 which generates a potential applied to terminals 26 of phase windings A-C which opposes the potential induced at terminals 22 of phase windings A-C caused by turning off of the pairs of switches Q1 and Q2, Q1 and Q3, and Q1 and Q4 sequentially as described above with respect to the prior art. The potential generation circuit 40 comprises a transformer 42 having a primary winding 44 and a secondary winding 46. The primary winding 44 is contained in a series circuit 48 which has a diode 50 connected in series with the primary winding 44 between the terminals 14 and 16 of the power supply 12. The secondary 46 is in series with the first diode 24 contained in the prior art described above. Additionally, diode 52 supports the transformer voltage and prevents the bottom switches Q2–Q4 from reverse conducting.

The present invention functions to generate the potential at terminals 26 of the phase windings A-C which opposes the induced potential at terminal 22 in response to the controller 18 generating signals to cause the switches to turn off which are connected to a phase winding in which current flow is to be stopped as follows. Prior to turning off of a pair of switches associated with the phase winding in which it is desired to stop current flow, diode 50 is reverse biased which causes the power supply potential to be dropped totally across diode 50 as a consequence of its high impedance with respect to the impedance of the primary winding 44 of the transformer 42. When the switch controller 18 generates the signals which are applied to the pair of switches which are connected to the phase winding in which it is desired to stop current flow, a positive potential is induced at terminal 22 of the phase winding in which current flow is to stop which causes freewheel diode 20 to be forward biased to cause current flow through the power supply 12 through the secondary winding 46 of transformer 44 which forward biases diode 24. The initial positive voltage drop across the secondary winding 46 causes the primary winding 44 to be positively biased at the anode of diode 50 which forward biases diode 50. Forward biasing of diode 50 causes the impedance of the diode to drop substantially to drop the voltage drop across diode 50 from the power supply potential to one diode drop with a remainder of the power supply potential being dropped across the primary winding 44 of the transformer 42. As a result, the potential drop across the primary winding 44 rises to power supply potential V less one diode drop. A changed secondary potential nV is induced in the secondary winding 46. The change may be either a step up or a step down. The choice of step up or step down is determined by the potential needed to insure fast turnoff. The turns ratio of the transformer 42 is n. The secondary potential nV is applied to terminal 26 less one diode drop which opposes the induced potential at terminal 22. The potential at terminal 26 accelerates stopping of current flow in the winding connected to the pair of switches being turned off which permits stopping of current flow to be accelerated over that of the prior art circuit described above with respect to FIG. 1. As a result, the point at which the controller must command the switches connected to a phase winding in which it is desired to stop current flow may be retarded with respect to rotor position over the prior art described above with respect to FIG. 1 which increases the torque output of the motor.

While the invention has been described in terms of its preferred embodiment, it should be understood that numerous modifications may be made thereto without departing from the spirit and scope of the invention as defined in the appended claims. It is intended that all such modifications fall within the scope of the appended claims.

We claim:

1. A circuit for controlling energizing each phase winding of a variable reluctance motor to produce rotation of a rotor comprising:

a first switch having first and second electrodes which are electrically connected together in response to a control signal applied to a control electrode, the first electrode being connectable to a first potential of a DC power supply and the second electrode being connected to a first terminal of each phase winding and at least one additional switch with each additional switch having first and second electrodes which are electrically connected together in response to a control signal applied to an electrode, the first electrode of each additional switch being connected to a second terminal of an associated phase winding and the second electrode of each additional switch being connectable to a second potential of the DC power supply;

a number of freewheel diodes equal in number to the number of phase windings, a first electrode of each diode being connected to the second terminal of the associated phase winding and a second electrode of each freewheel diode being connectable to the first potential of the DC power supply;

a first diode having a first electrode, and a second electrode coupled to the first terminal of each phase winding;

a controller for generating the control signals of each of the switches to control the flow of current in the phase windings including turning off the flow of current in each phase winding; and means coupled to the first electrode of the first diode, in response to the control signals being applied to the first switch and one of the at least one additional switch, to cause current to stop flowing in the phase winding connected to the switches being turned off, for generating a potential applied to the phase winding connected to the switches being turned off to oppose a potential induced in the phase winding connected to the switches being turned off in response to initiating turning off of the switches to accelerate stopping the current flow in the phase winding connected to the switches being turned off.

2. A circuit in accordance with claim 1 wherein the means for generating comprises:

a transformer having a primary and a secondary winding, the primary winding being connected in series with a second diode in a series circuit which is connected between the first and second potentials of the power supply, the second diode being reverse biased until the control signals are applied to the first switch and one of the at least one additional switch, to cause current to stop flowing in the phase winding connected to the switches being turned off, and being forward biased in response to the control signals being applied to the switches being turned off, and the secondary winding being connected in series with the first diode.

3. A circuit in accordance with claim 2 wherein:

the generated potential is changed from the primary to the secondary winding.

4. A circuit in accordance with claim 3 wherein: the first diode is forward biased in response to the control signals causing the switches to be turned off and the second diode is forward biased in response to the flow of current caused by forward biasing of the first diode.

5. A circuit in accordance with claim 1 further comprising:
an additional diode connected between each of the additional switches and the second potential of the power supply.

6. A circuit in accordance with claim 2 further comprising:
an additional diode connected between each of the additional switches and the second potential of the power supply.

7. A circuit in accordance with claim 3 further comprising:
an additional diode connected between each of the additional switches and the second potential of the power supply.

8. A circuit in accordance with claim 4 further comprising:
an additional diode connected between each of the additional switches and the second potential of the power supply.

9. A circuit in accordance with claim 1 wherein: the switches are semiconductor switches.

10. A circuit in accordance with claim 2 wherein: the switches are semiconductor switches.

11. A circuit in accordance with claim 3 wherein: the switches are semiconductor switches.

12. A circuit in accordance with claim 4 wherein: the switches are semiconductor switches.

13. A circuit in accordance with claim 5 wherein: the switches are semiconductor switches.

14. A circuit in accordance with claim 6 wherein: the switches are semiconductor switches.

15. A circuit in accordance with claim 7 wherein: the switches are semiconductor switches.

16. A circuit in accordance with claim 8 wherein: the switches are semiconductor switches.

17. In a circuit for stopping current flow in each phase winding of a variable reluctance motor to produce rotation of a rotor, the improvement comprising:
a pair of semiconductor switches respectively connected between different terminals of each phase winding, and first and second potentials of a power supply, each pair of switches disconnecting the phase winding from the power supply; and
means, in response to signals being applied to each pair of switches by a controller to cause each pair of switches to turn off, for generating a potential applied to the phase winding connected to the switches being turned off to oppose a potential induced in the phase winding connected to the pair of switches being turned off to accelerate stopping current flow in the winding connected to the pair of switches being turned off.

18. A circuit in accordance with claim 17 wherein the means for generating comprises:
a transformer having a primary and a secondary winding, the primary winding being connected to a primary winding diode in a series circuit which is connected between the first and second potentials of the power supply, the primary winding diode being reverse biased until the signals are applied to the switches to cause current to stop flowing in the phase winding connected to the switches being turned off and being forward biased in response to the signals being applied to the switches being turned off, and the secondary winding being connected in series with a secondary winding diode.

19. A circuit in accordance with claim 18 wherein: the generated potential is changed from the primary to the secondary winding.

20. A circuit in accordance with claim 19 wherein: the primary winding diode is forward biased in response to the flow of current caused by an initial current flow through the secondary winding which causes the potential to be generated by the secondary winding.

21. A circuit in accordance with claim 17 further comprising:
a diode connected between one of the switches and the second potential of the power supply.

22. A circuit in accordance with claim 18 further comprising:
a diode connected between one of the switches and the second potential of the power supply.

23. A circuit in accordance with claim 19 further comprising:
a diode connected between one of the switches and the second potential of the power supply.

24. A circuit in accordance with claim 20 further comprising:
a diode connected between one of the switches and the second potential of the power supply.

25. A method for stopping current flow in each phase winding of a variable reluctance motor in which the current flow through each phase winding is controlled by controlling conductivity of first and second switches respectively connectable to first and second reference potentials of a power supply and to different terminals of each phase winding to produce rotation of a rotor comprising:
generating control signals for causing the first and second switches to stop the current flow in each phase winding; and
in response to a potential induced in each phase winding by initiating turning off of the switches, generating a potential applied to each phase winding to oppose the induced potential to accelerate stopping current flow in the phase winding connected to the switches being turned off.

* * * * *